US007146293B2

(12) United States Patent
Badovinac et al.

(10) Patent No.: US 7,146,293 B2
(45) Date of Patent: Dec. 5, 2006

(54) STATUS MONITORING OF A PLURALITY OF IMAGE PROCESSING DEVICES

(75) Inventors: Jan M. Badovinac, Toronto (CA); Estella Stok, Eindhoven (NL)

(73) Assignee: OCE-Technologies B.V., Venlo (NL)

( * ) Notice: Subject to any disclaimer, the term of this patent is extended or adjusted under 35 U.S.C. 154(b) by 288 days.

(21) Appl. No.: 10/682,035

(22) Filed: Oct. 10, 2003

(65) Prior Publication Data

US 2004/0228639 A1 Nov. 18, 2004

(30) Foreign Application Priority Data

Oct. 14, 2002 (EP) ................................ 02079457

(51) Int. Cl.
*G06F 19/00* (2006.01)

(52) U.S. Cl. ...................................... 702/188; 702/189

(58) Field of Classification Search ................ 702/188, 702/189; 455/3.03, 3.05, 149
See application file for complete search history.

(56) References Cited

U.S. PATENT DOCUMENTS

| | | | | |
|---|---|---|---|---|
| 5,398,257 A | | 3/1995 | Groenteman | |
| 5,414,494 A | | 5/1995 | Aikens et al. | |
| 5,701,548 A | * | 12/1997 | Okatani | 399/8 |
| 5,787,149 A | | 7/1998 | Yousefi et al. | |
| 5,822,221 A | * | 10/1998 | Groenteman | 702/188 |
| 6,934,542 B1 | * | 8/2005 | Ikeda | 455/425 |
| 2001/0020892 A1 | | 9/2001 | Helferich | |
| 2002/0118974 A1 | | 8/2002 | Ikeda | |

FOREIGN PATENT DOCUMENTS

| | | |
|---|---|---|
| EP | 2000174929 | 6/2000 |
| EP | 1 109 395 A | 6/2001 |
| WO | WO 02/077718 A1 | 10/2002 |

* cited by examiner

*Primary Examiner*—Michael Nghiem
*Assistant Examiner*—Douglas N. Washburn
(74) *Attorney, Agent, or Firm*—Birch, Stewart, Kolasch & Birch, LLP

(57) ABSTRACT

A method and system for monitoring the operating status of a plurality of image processing devices located in a proximate environment, which includes at least one transmitter connected to the plurality of image processing devices for sending wireless signals incorporating operating status data of each of the image processing devices and a portable terminal provided with a receiver for receiving the wireless signals. The portable terminal is provided with a display and with a presentation module for presenting data for each of the image processing devices in the form of either a general system status indication or a device status indication regarding a particular image processing device, in accordance with a predetermined presentation scheme. The general system status indication is primarily intended for confirming that all devices are in order, and is automatically replaced by a device status indication regarding a particular device, when that device needs attention.

31 Claims, 9 Drawing Sheets

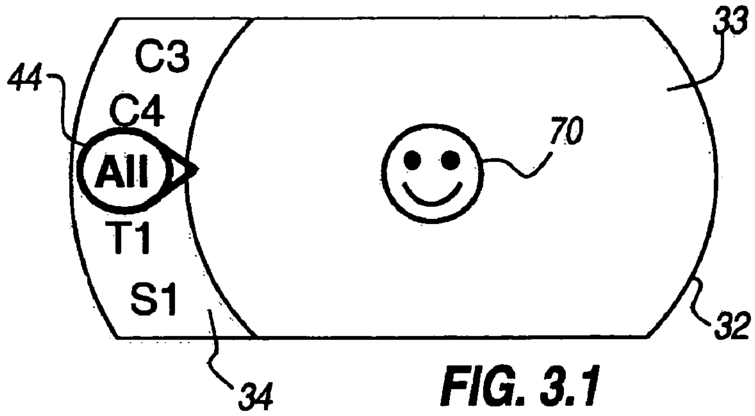
FIG. 3.1
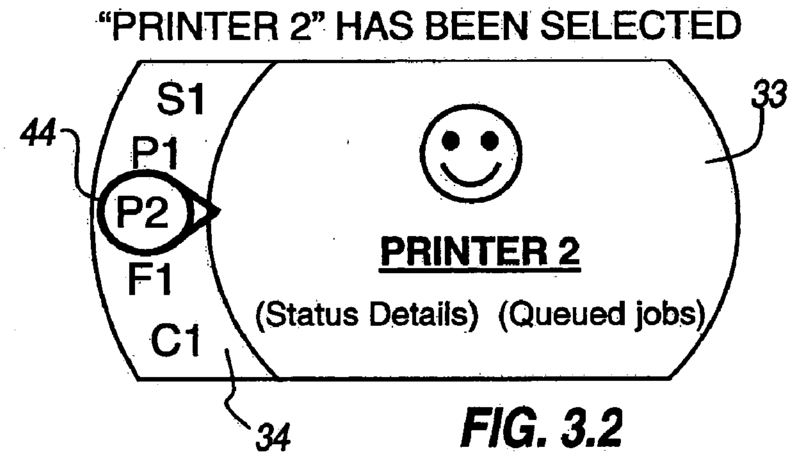
FIG. 3.2
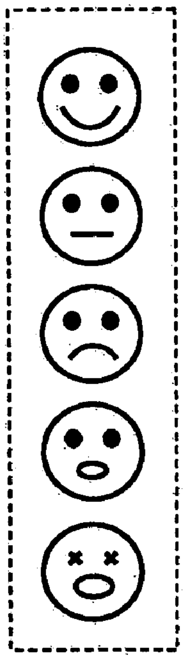
FIG. 6
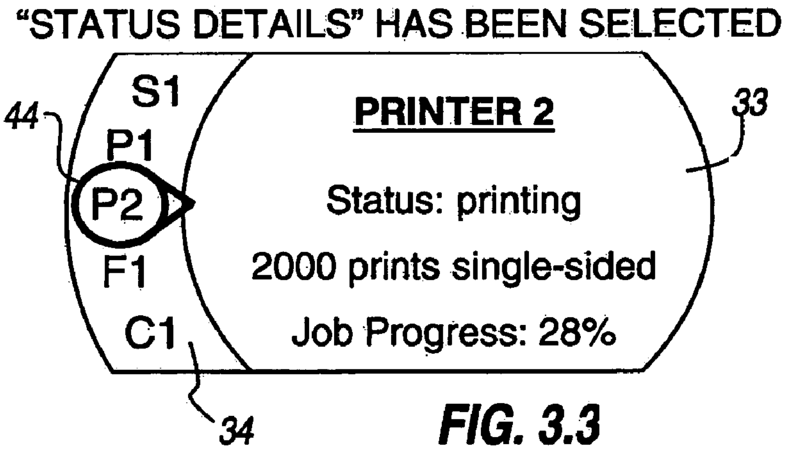
FIG. 3.3

“QUEUED JOBS” HAS BEEN SELECTED
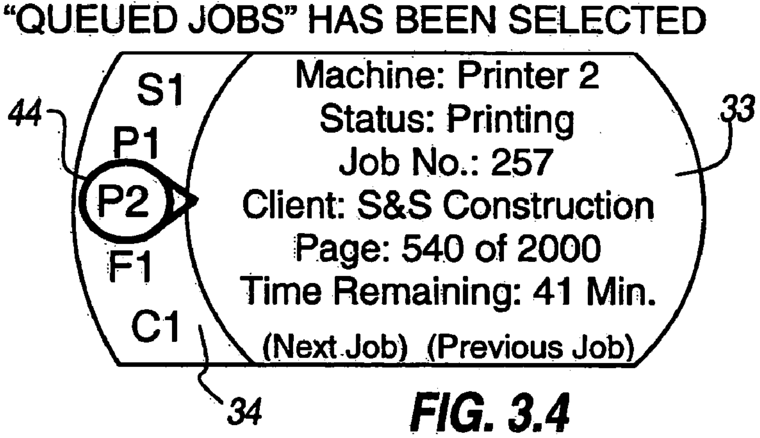
FIG. 3.4
LIST HAS BEEN SCROLLED
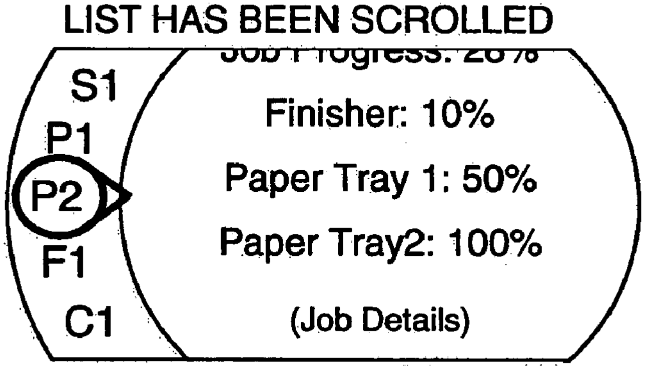
FIG. 3.5
“COPIER 1” HAS BEEN SELECTED
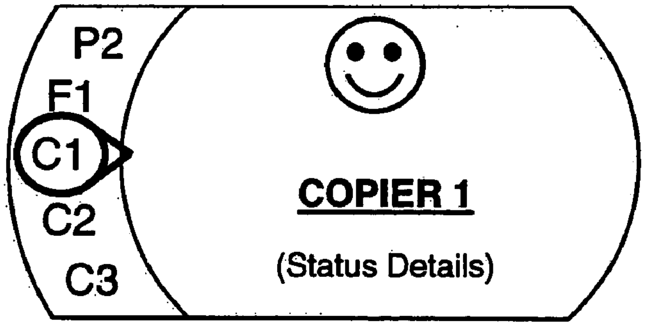
FIG. 3.6

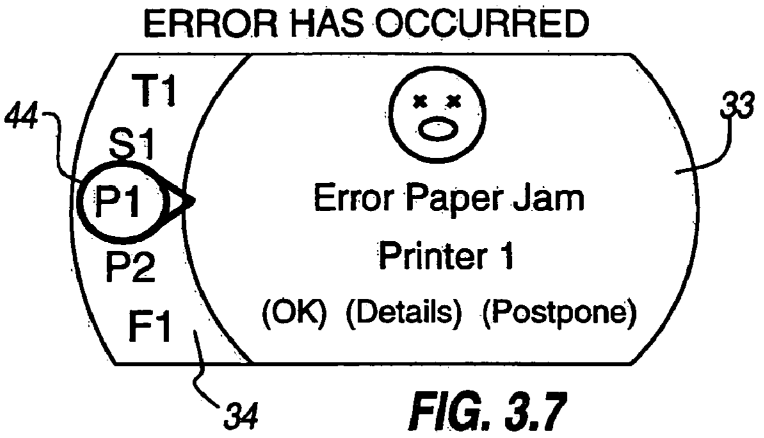
FIG. 3.7
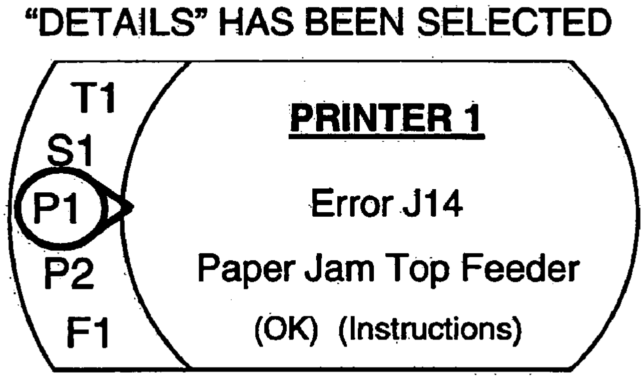
FIG. 3.8
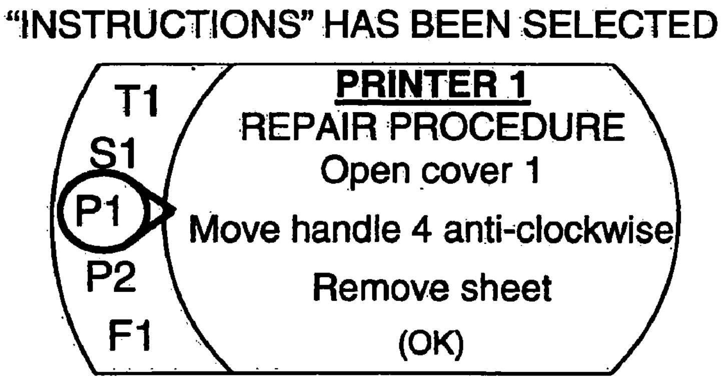
FIG. 3.9

"POSTPONE" HAS BEEN SELECTED AND CONFIRMED
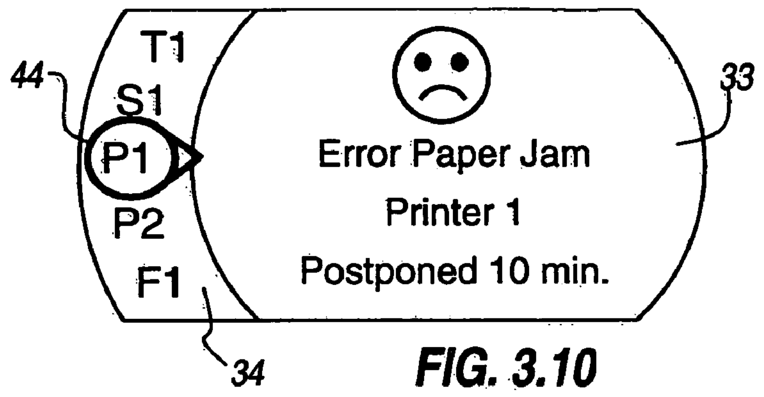
FIG. 3.10
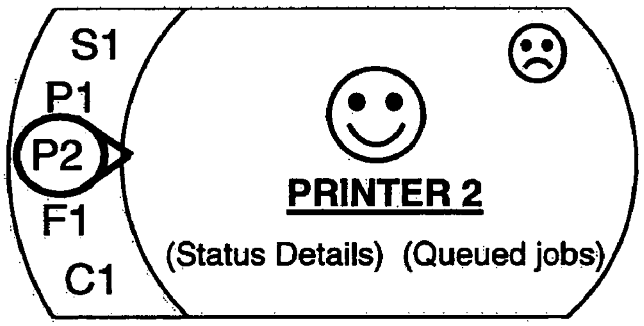
FIG. 3.11
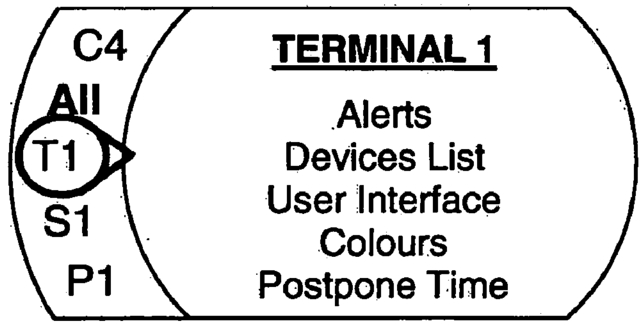
FIG. 3.12

STATUS MONITORING OF A PLURALITY OF IMAGE PROCESSING DEVICES

BACKGROUND OF THE INVENTION

1. Field of the Invention

The present invention relates to a method and a system for monitoring the operating status of a plurality of image processing devices located in a proximate environment, and to a portable terminal for monitoring the operating status of a plurality of image processing devices in a proximate environment.

2. Related Art

The general term “image processing device” as used here includes printers, plotters, scanners, copiers, fax machines online finishers, off-line finishers and combinations or variations thereof, i.e. “image processing” includes also merely handling documents or sheets of paper.

U.S. Pat. No. 5,398,257 discloses a copying machine including copying circuitry controlled by a copier processor. The copier processor gathers and generates status information for the copying machine and this status information is transmitted to a remote processor by a wireless transceiver. A transceiver processor may be used to analyze the status information and control operation of the wireless transceiver. The wireless transceiver may also receive information and corrective action in response to the transmitted status information for use by the copier processor in controlling the operation of the copying circuitry. A monitoring network is formed using a plurality of copying machines that send status information to a base processor through a base transceiver. The base processor can initiate appropriate action in response to received status information.

U.S. Pat. No. 5,822,221 discloses an office machine monitoring device that includes an interface circuit coupled to the logic circuit and the display circuit of the office machine. The interface circuit intercepts data from the logic circuit of the office machine while allowing the display circuit of the office machine to receive the data. The data intercepted by the interface board is processed by a microcontroller unit, placed into a wireless message format, and sent to a monitoring base through a wireless transceiver unit. This office machine monitoring device provides an interface unit within the office machine to intercept data without affecting the operation of the office machine and to provide monitoring of office machines without performing manual checks or establishing expensive communication links to a remote host monitoring computer.

U.S. Pat. No. 5,787,149 discloses a method and apparatus for managing remotely located document-producing machines by using cellular technology. The apparatus includes a central computer, a central cellular radio station, and a number of remote document-producing nodes. The central computer generates a copier management command directed towards a selected one of the remote document-producing nodes, and supplies this command to the central cellular radio station. This radio station then uses a central cellular radio to relay the copier management command to the selected remote copier node. Alternatively, a remote document-producing node initiates a remote management operation by transmitting management data to the central cellular station.

The above described copier and network solutions avoid the use of hardwire installation for the monitoring of copying machine status information and provide copying machines that implement a wireless transceiver for the transmission of status information. The copying machine status information can, however, only be received at a fixedly located centralized base processor.

U.S. Pat. No. 5,701,548 discloses a copying system wherein operation modes of a copying machine are set using an IC card located at a distance from the copying machine. The IC card has a transmitter for transmitting a signal that contains an identification code for identifying the IC card itself; an identification code for identifying a specific copying machine, prestored operation mode setting information for the copying machine; a receiver for receiving a signal transmitted from the copying machine; a CPU for identifying the copying machine and its operating condition; and a display. The copying machine has a transmitter for transmitting a signal that contains an identification code for identifying the copying machine itself, an identification code for identifying the IC card, information concerning the operating condition of the copying machine itself; a receiver for receiving a signal transmitted from the IC card; and a CPU for identifying the originating IC card and for setting the copying machine operation mode. When the IC card comes within a short distance of the specific copier, the copier takes on the operating mode stored in the IC card and transmits its operating condition to the IC card, which displays it.

The IC card can be inserted in an offline job commander for programming the IC card.

In a central reprographics department it is very important that the image processing devices will continue to operate. Paper jams, print jobs which need special inserts, empty paper trays and full finishers are examples of operating states in which the image processing device will stop operating and operator interaction is immediately required. However, the operator could be out of reach of the image processing device’s audible or visible clues, or could be removed from the central base processor.

There is therefore a need for an improved system for monitoring a plurality of image processing devices.

SUMMARY OF THE INVENTION

With this background, it is an object of the present invention to provide a method and a system for monitoring the operating status of a plurality of image processing devices of the kind referred to initially, which is capable of continuously keeping a freely moving operator informed of the operating status of the entire population of image processing devices in an easy way.

This object is achieved by providing a method of monitoring the operating status of a plurality of image processing devices located in a proximate environment, comprising sending wireless signals incorporating the operating status data for each of said image processing devices, receiving the wireless signals in at least one portable terminal, and presenting status data to an operator of the portable terminal in the form of either a general system status indication or a device status indication regarding a particular image processing device, in accordance with a predetermined presentation scheme.

Another object of the present invention is achieved by a system for monitoring the operating status of a plurality of image processing devices located in a proximate environment, utilizing at least one transmitter connected to the plurality of image processing devices, said transmitter being provided with means for sending wireless signals incorporating the operating status data for each of the image processing devices and at least one portable terminal provided with a receiver for receiving the wireless signals, with display means and with a presentation module for presenting on the display the status data for each of the image processing devices in the form of either a general system status indication or a device status indication regarding a particular image processing device, in accordance with a predetermined presentation scheme.

The system may include a server connected to the plurality of image processing devices for collecting the operating status data and passing the operating status data on to the transmitter, thus allowing a reduction in the number of transmitters.

Preferably, the server preprocesses the operating status data before passing the status data on to the transmitter, thus reducing the amount of data to be sent by the transmitter.

The signal sent by the transmitter can be a radio frequency (RF) signal, preferably a low power RF signal and even more preferable, an RF signal as defined in the Bluetooth specification 1.0A, 1.0B or 1.1.

Alternatively, the signals sent by the transmitter are infrared (IR) signals, which is particularly advantageous because no license is required for using RF signals. When the operator and the image processing devices are not all located within one room, repeaters could be used to transmit the signal to the other rooms.

Each of the image processing devices may be provided with a transmitter for sending wireless signals incorporating image processing device status data.

Each of the image processing devices and the portable terminal may be connected to a wireless network.

In an embodiment of the present invention, the predetermined presentation scheme mentioned above prescribes presenting the general system status indication and automatically switching to the device status indication regarding a particular image processing device when a predetermined event occurs in that particular image processing device. Accordingly, the general system status is the default presentation, and only if a specific device needs attention, its status is shown. In this way, as long as all devices run properly, the operator may in one glance check that everything is in order, and is not bothered with details that he does not need at that situation.

In an alternative embodiment, an operator of the portable terminal may himself select status information regarding a particular image processing device, using operating elements provided on the terminal.

In a further embodiment, the device status information is presented in one of at least two operator-selectable presentation levels, including a first global level and a second detailed level, each level having an associated presentation format. At the global level, presentation includes simple graphical symbols, such as the well-known "smileys", such that the operator can have an indication of the status in a single glance.

The device status information regarding a specific image processing device is automatically shown on the portable terminal, according to a predetermined priority scheme, when an event occurs in that specific device. High priority events, such as those events that impede operation of the device, e.g. a paper jam or an empty paper tray, are always shown, while events of a lower priority, such as events that hamper normal operation, but need not be remedied immediately, e.g. toner level low, are only shown when the operator carrying the portable terminal is in the neighborhood of the device.

Events that concern normal, non-problematic, status changes such as starting or finishing printing, have no priority status and are only shown when the operator expressly selects the status of that device.

It is yet another object of the present invention to provide a portable terminal for use in the system of the present invention.

By providing means to select the device for which the operating status should be displayed, a relatively small display as typically used in portable devices is sufficient to efficiently represent the status data of an image processing device.

In order to warn the operator, the portable terminal may include a means for producing a visual and/or audio and/or vibration alert.

The portable terminal may be provided with a color display, whereby the status of a selected image processing device is displayed as a color coded graphical icon.

Further objects, features and advantages of the system for monitoring the operating status of a plurality of image processing devices located in a proximate environment, and the portable terminal for monitoring the operating status of a plurality of image processing devices located in a proximate environment according to the present invention will become apparent from the detailed description hereinbelow and the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3.1 to FIG. 3.12 show the content of the display of the portable terminal in different statuses of the display;

FIG. 6 shows examples of status-describing icons ("smileys").

DETAILED DESCRIPTION OF THE INVENTION

The general term "image processing device" as used here includes printers, plotters, scanners, copiers, fax machines, online finishers, off-line finishers and combinations or variations thereof i.e. "image processing" also includes merely handling documents or sheets of paper.

Figure 1:
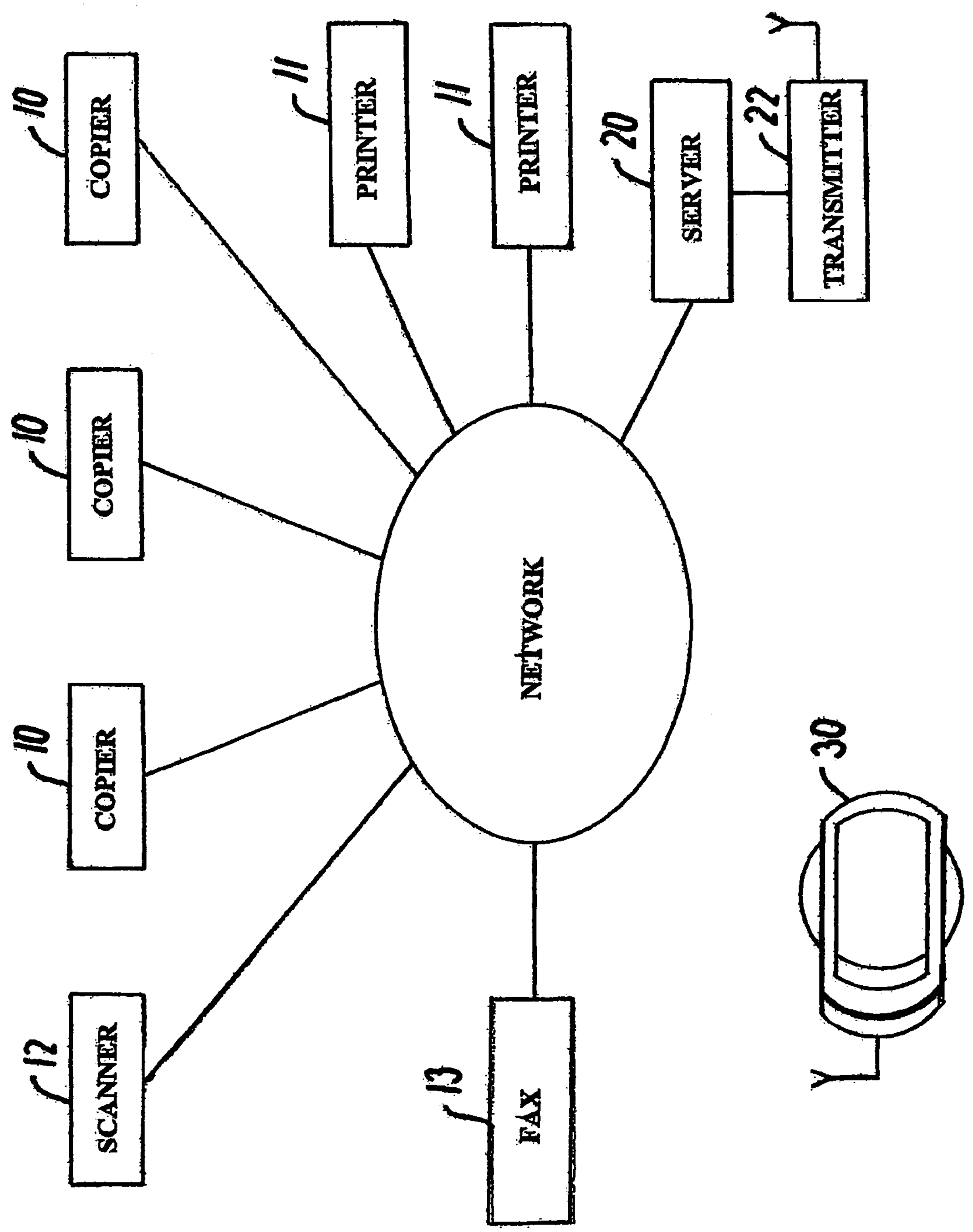
FIG. 1 is a diagrammatic representation of a system for controlling the operating status of a plurality of image processing devices.

With reference to FIG. 1, a plurality of image processing devices in a centralized reprographic department is shown. In this embodiment, three copiers 10, two printers 11, one scanner 12 and one fax 13 are all connected to a local area network. Each of these devices is capable of transmitting their operating status via a network card to an address in the network. A server 20 in the form of a PC is connected to the network and a wireless transmitter 22. The image processing devices 10,11,12,13 send their operating status to the server at regular intervals, either on their own initiative or upon being polled, and without delay in the case of an error. The server processes the status information into an appropriate code for wireless transmission that includes information uniquely identifying the image processing devices 10,11,12, 13. The transmitter 22 may be a radio frequency (RF) transmitter using a low intensity signal, such as in accordance with a Bluetooth standard. Alternatively, the transmitter may use more intensive RF signals such as defined in the IEEE 802.11a or IEEE 802.11b wireless LAN standard.

The transmitter 22 may alternatively be of the type that sends infrared (IR) signals incorporating the operating status data. Preferably, the IrDA standard is used for the IR signals.

The image devices are thus all in a proximate environment, i.e. in an environment such as a centralized reprographic department, in which a plurality of these type of devices are located within one building or within one building complex. The image processing devices could all be located in one single room, but they could also be spread over several rooms, floors or wings of the building or building complex.

A portable terminal 30 receives the signals sent by the transmitter 22 and is used to present the operating status data of the different image processing devices to a freely moving operator. The portable terminal 30 is provided with a memory that is preferably of a permanent nature, and registers each of the image processing devices in its proximate environment by storing registration data for each of the image processing devices.

Figure 2:
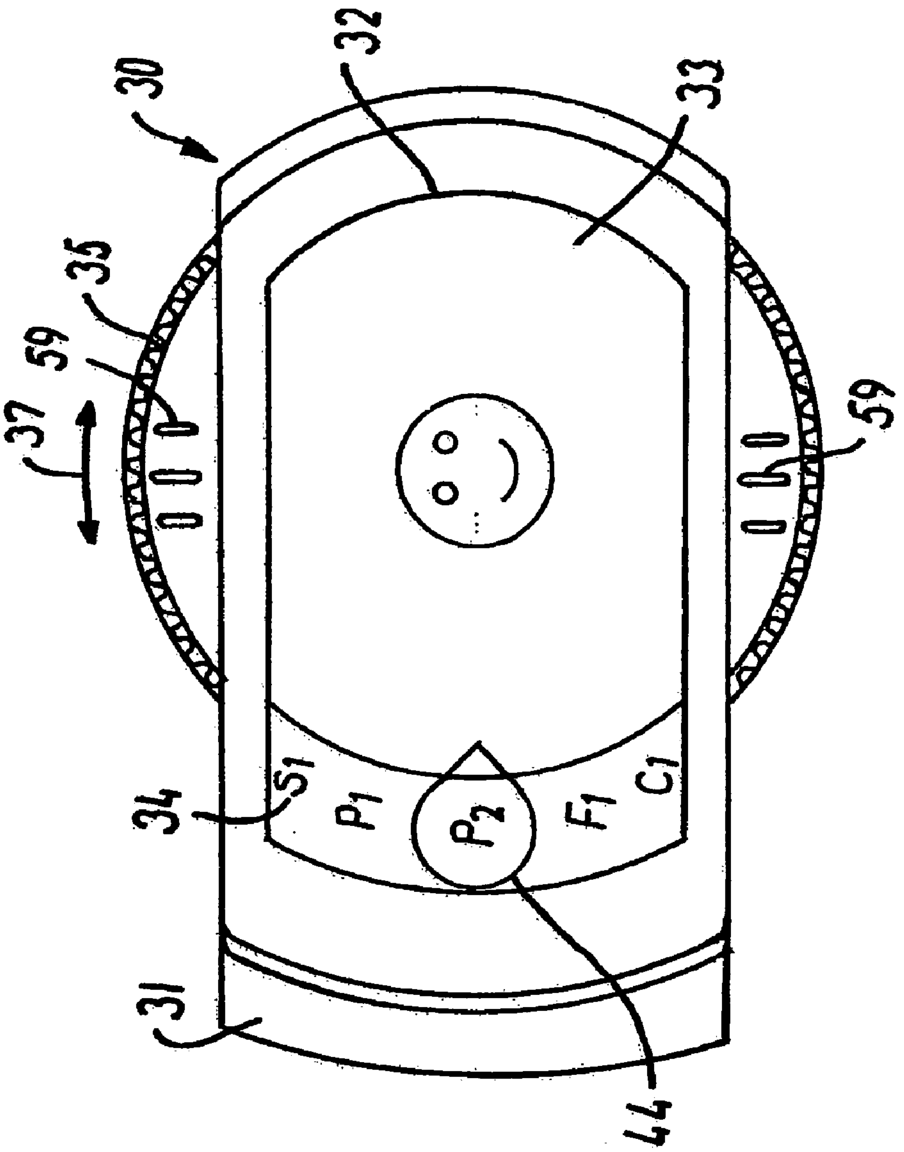
FIG. 2 is a detailed view on a portable terminal in a first preferred embodiment according to the present invention.
Figure 2A:
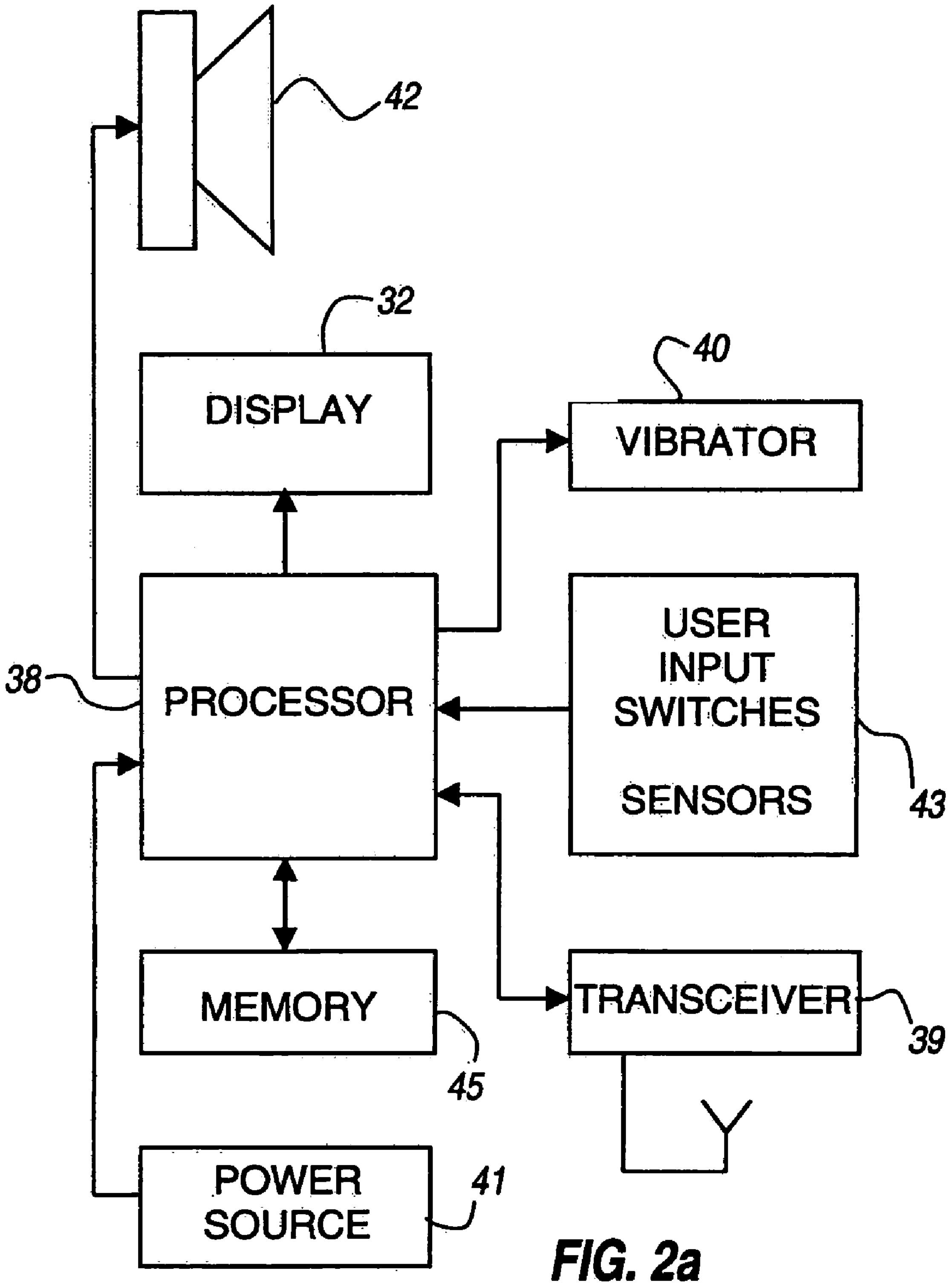
FIG. 2*a* is a diagrammatic representation of the electronic components of the portable terminal.

With reference to FIG. 2, according to a first preferred embodiment, the portable terminal 30 comprises a housing 31 and is provided with a display 32 and a rotary ring 35. The display is a color display capable of showing text and graphical objects. Further, with reference to FIG. 2*a* a processor 38, a memory 45, a loudspeaker 42 arranged under slots 59 for producing audible alerts and a vibrator 40 for producing vibration alerts are provided. The terminal also comprises a transceiver 39 of a type that matches the respective type of transmitter described above, i.e. an RF or IR transceiver. Power is supplied by a power source 41 in the form of rechargeable batteries, preferably provided with an induction charger (not shown). A block 43, representing the switches and sensors for user input is like the other electronic components 32,39,40,41 and 42 connected to processor 38 that controls the operation of the portable terminal 30.

The display 32 includes in two sections:

section 34 is used to display an arc-shaped array of objects representing individual image processing devices, preferably in the form of graphical icons, section 33 is used for displaying status and menu information.

Figure 2B:
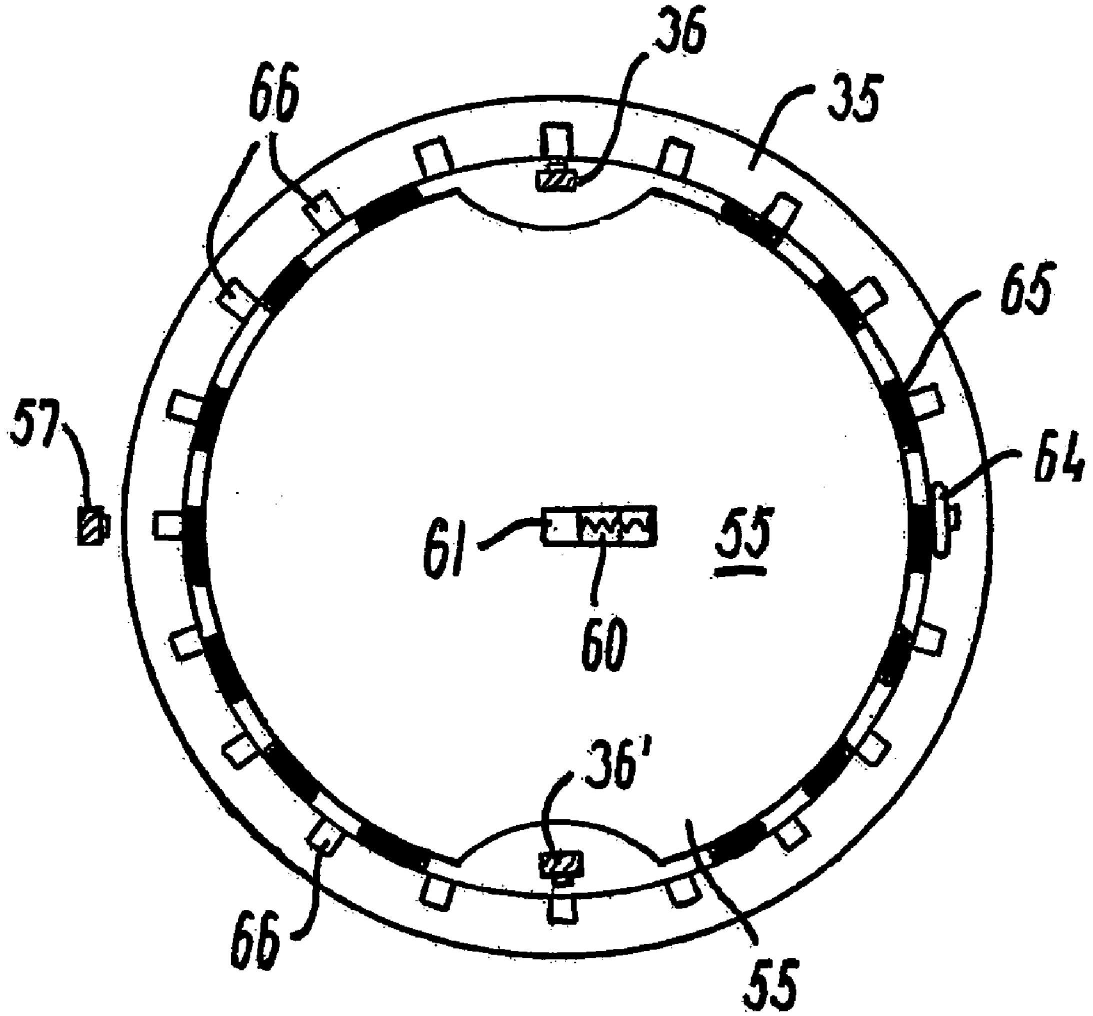
FIG. 2*b* is a cut open view on the rotary ring and associated bearing and switches.

The rotary ring 35 protrudes from both side surfaces of the housing 31 and is made of an elastically deformable material. As best shown in FIG. 2*b*, the rotary ring is guided by a disk 55 provided with circumferentially spaced bearing blocks 63 made of a low friction material such a nylon or teflon, or other suitable guiding elements. The disk is slidably guided by a slit 60 that engages a pin 61 connected to the frame of the portable terminal. This construction allows the operator to slide the rotary ring sideways towards a switch 57 to actuate the latter. A spring located in the slit 60 urges the disk 55 away form the switch 57.

Figure 2C:
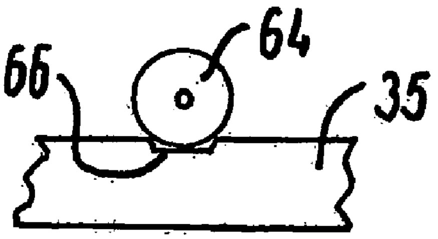
FIG. 2*c*, shows a detail of a wheel used to pick up angular movements of the rotary disk.

As best shown in FIG. 2*c*, a wheel 64 connected to an angular displacement detector (not shown) is arranged to be in frictional contact with the side surface of the rotary ring 35. The wheel 64 rotates, be it a factor faster, when the rotary ring is turned. The signal of the angular displacement sensor is sent to the processor 38. The side surface of the ring is provided with recesses 66 that form arresting positions for the rotary ring 35.

A first pressure switch 36 is located in a recess of disk 55 close to the radially inner surface of the rotary ring 35 on one side of the portable terminal. A second pressure switch 36' is located in a recess of disk 55 close to the radially inner surface of the rotary ring 35 on the opposite side of the portable terminal. When an operator presses on the ring at the position of a switch 36, 36', it deforms and the corresponding switch is activated.

In this way, the rotary ring 35 functions as a plurality of buttons for operator interaction with the portable terminal 30.

Pressing both "button" sections of the rotary ring 35 for a longer period, preferably longer than 1.5 seconds, is interpreted as a command to switch the terminal on and off. After turning the portable terminal on, the display is activated and takes the state as shown in FIG. 3.1, with an array or list of graphical icons representing image processing devices displayed in a scrollable format in section 34 and general information displayed in section 33, normally showing an icon indicating that all image processing devices are functioning properly in the form of a glyph, such as a happy blue smiley 70. When errors or disturbances have occurred, a smiley with a less happy expression and a changed color (red) is displayed. Matters needing attention at some point, but which do not require immediate attention are indicated by a green smiley with the appropriate facial expression, i.e. sad (miserable) or screaming for attention. Examples of such expressions are shown in FIG. 6.

By turning the rotary ring 35, the operator can scroll through lists or other arrays. Pressing a single button at a time, i.e. one of the side sections of the rotary ring, selects a highlighted or marked item. Depressing the side sections simultaneously for a short period, i.e. less than 1 second, serves to return to the previous state or screen.

Figure 5:
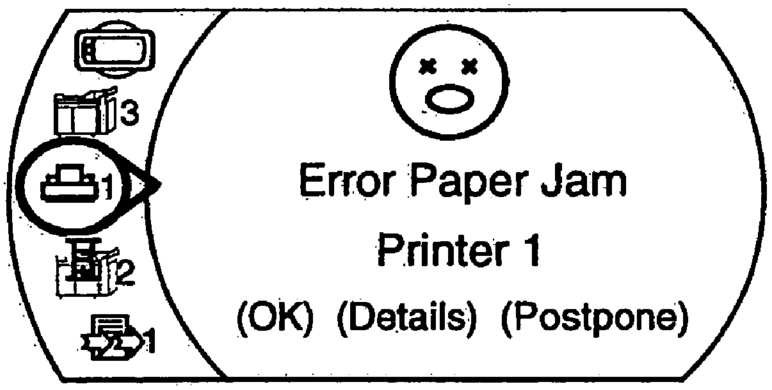
FIG. 5 shows a display that uses graphical icons.

In the display section 34, an array of icons is displayed, forming in this example a list of the image processing devices for which the status is being monitored: Terminal (T1),Scanners (S1, S2), Printers (P1, P2), Faxes (F1), Copiers (C1, C2, C3, C4) and the total system (All). T1 is the portable terminal 30 itself. Thus, a different graphical icon is assigned to each image processing device, the total system and the portable terminal itself. The icons may have the form of acronyms (such as shown in FIG. 3.1), but may also have a graphical appearance resembling the particular device, as is shown in FIG. 5.

A static marker is provided in the form of a selection loop 44, indicating the currently selected device. By sliding the rotary ring 35 sidewards, thereby actuating the switch 57, the array of icons is activated. Once activated, the array of icons can be scrolled by turning the rotary ring 35.

The software controlling the user interface is programmed to scroll the array of icons in the same direction as the rotary ring 35. The software may also be programmed such that the movement of the array of icons is proportional to the movement of the rotary ring 35. Preferably, the software is programmed such that the movement of the array of icons coincides with the movement of the rotary ring 35 in a manner that gives the operator the impression that the array of icons is mechanically connected to the rotary ring 35 because they move in unison.

When the operator has scrolled the array so that the appropriate graphical icon is located in the loop 44, displaying the status of the corresponding device is selected by pressing any of the "button" sections of the rotary ring 35, upon which the display 32 turns to the state as shown in FIG. 3.2. In this example, Printer 2 has been selected.

The upper part of section 33 of the display 32 shows a happy smiley face since the selected device is functioning properly. Below the smiley, the text "Printer 2" is displayed.

In the bottom part of section 33 the selectable menu items "Status Details" and "Queued jobs" are displayed. One of the selectable items is highlighted, e.g. by using a different color for the selected item or by underlining. Turning the rotary ring 35 scrolls through the "list" of selectable menu items. The highlighted menu item is selected by pressing any of the "button" sections of the ring.

When "Status Details" is selected in the state as shown in FIG. 3.2, the display 32 turns to the state as shown in FIG. 3.3. The upper part of section 33 displays the text "Printer 2". Below this text a list with status information is displayed, in this example:

Status: Printing
2000 Prints Single Sided
Job Progress: 28%

Since the list of information items is too long to be completely shown on the display, further items can be "scrolled" into the display area by turning the rotary ring 35 without displacing it in the way that it would activate switch 57 (FIG. 2*b*). FIG. 3.5 shows the display screen after such scrolling. In the given example, it now reads:

Job Progress: 28%
Finisher: 10%
Paper Tray 1: 50%
Paper Tray 2: 100%

The bottom of display section 33 shows the selectable menu item "Job Details", which brings the display to the status shown in FIG. 3.4. This display status can also be reached by selecting the menu item "Queued Jobs" in the display status shown in FIG. 3.2.

Shortly pressing both "button" sections of the rotary ring 35 at the same time brings the display to the status as shown in FIG. 3.2. Once again pressing both sections brings the display in the state as shown in FIG. 3.1.

In the display status as shown in FIG. 3.4, Section 33 lists the details of the current job such as: "Machine", "Status", "Job Nr.", "Client", "Page", and "Time remaining". In the bottom part of section 33 the selectable menu items "Next job" and "Previous job" are shown. Selecting "Next job" will display the details of the next job in the print queue, just as selecting "Previous job" will display the details of the job last finished. Again, pressing both "button" sections of the rotary ring 35 at the same time will bring the display in the status as shown in FIG. 3.2.

Turning the rotary ring 35 clockwise without activating switch 57 scrolls the array of icons in section 34 in the same direction, and vice versa. Preferably, the rotary ring 35 is provided with arresting positions in the form of "clicks", whereby each "click" corresponds to a next step in the scrolled array or list, i.e. one click selects the next graphical item in the loop 38. Turning the rotary ring 35 two "clicks" clockwise and selecting the graphical item assigned to copier 1, which is now located in the selection loop 44, brings the display from the state shown in FIG. 3.1. to the state as shown in FIG. 3.6.

Errors, such as paper jams, and other disturbances that need immediate attention are displayed with priority. Such events include paper jams, empty paper trays, low cooling liquid, full finishers, out of staples, toner empty, special insert needed, special paper needed, etc. These alerts are displayed immediately by showing a red and sad or even a screaming smiley face in display section 33, the specific expression being selected in dependence on the seriousness of the situation.

Some alerts that do not require immediate attention such a low toner or low paper level in paper trays, are displayed in section 33 with a lower priority expression. These alerts are only displayed if the operator is in the vicinity of the image processing device in question, and with a green neutral smiley signalling that attention is needed, but not immediately. When the alert becomes more serious, the smiley expression may be changed into a more alarming one.

A paper jam is a serious error requiring immediate operator action. When, for example, a paper jam has occurred on printer 1, the display turns to the state as shown in FIG. 3.7, and in accordance with operator selectable settings, also an audible and/or vibration alarm is issued.

The upper part of section 33 now shows a sad and red smiley. Below the smiley, the text "Error: Paper jam" in large red letters is displayed. There below the text "Printer 1" is displayed. At the bottom of section 33 the selectable menu items "OK", "Details" and "Postpone" are displayed.

Selecting "OK" will acknowledge the alert and bring the display 32 to the state as shown in FIG. 3.1, but now with an unhappy smiley, the middle one of FIG. 6, but the error message has disappeared. The operator indicates by this selection that immediate repair action will be taken. When the operator would now select another device, e.g. printer 2 (which is working properly), the display 32 would change to a state as shown in FIG. 3.11, showing a happy smiley indicating the status of printer 2, but also a small unhappy smiley in the background indicating that not all of the devices in the system are in order. Once the jammed printer 1 registers that the repair has been carried out it sends a signal to the portable terminal to turn to the status as in FIG. 3.1 with a happy smiley face. The registration of the repair is part of the self check of the image processing device after all doors and covers are closed.

Selecting "Details" in the display shown in FIG. 3.7, brings the display to the state as shown in FIG. 3.8. Section 33 shows in the upper area the text "Printer 1". There below a detailed error message is shown, in the present example: "Error J14, paper jam top feeder". In the lower part of section 33 the selectable menu items "Instructions" and "OK" are displayed.

Selecting "instructions" brings the display to the state as shown in FIG. 3.9. The upper part of section 33 shows the text "printer 1". There below the steps needed to be taken to resolve the problem are listed in a scrollable list. In the present example, the list comprises "Open cover 1", "Move handle 4 anti-clockwise" ,"Remove stuck sheet" and "close cover 1". If the list of instructions is too long to be completely displayed on the display 32, it may be scrolled by turning the rotary ring 35. Informative pictures may also be shown on the display 32.

At the bottom part of display section 33 the selectable menu item "OK" is displayed, which when selected brings the display to the state as shown in FIG. 3.11, in which the portable terminal returns to its initial setting before the paper jam occurred, that is, the state shown in FIG. 3.2 reporting the status of printer 2. However, it also shows a red unhappy smiley icon in the upper right hand corner of the display section 33 as a warning that one of the other devices has an error and the terminal is waiting for a signal that the repair has been carried out, When "Postpone" is selected in the state of the display 32 as shown in FIG. 3.7, the display 32 turns to the state as shown in FIG. 3.10. The lower part of section 33 displays the confirmation message "Postponed 10 min", and the display will return to the state as shown in FIG. 3.11. After 10 minutes, or any other adjustable time period, the alert is repeated and the display will turn to the state shown in FIG. 3.7 again.

Selecting "T1", i.e. the portable terminal itself from the movable array of objects brings the display to the status as shown in FIG. 3.12. Section 33 shows a scrollable list of selectable menu items comprising, in this example, "Alerts", "Devices list", "User interface", "Colors", "Postpone time", "Language settings" and "Predetermined distance" (the last two items not shown). Scrolling the list with the rotary ring 35 highlights the selectable menu items one after another and pressing either the lower or upper button selects the highlighted menu item. The operation of carrying out changes to the settings is not shown here in detail and will be apparent to the skilled reader.

Figure 4:
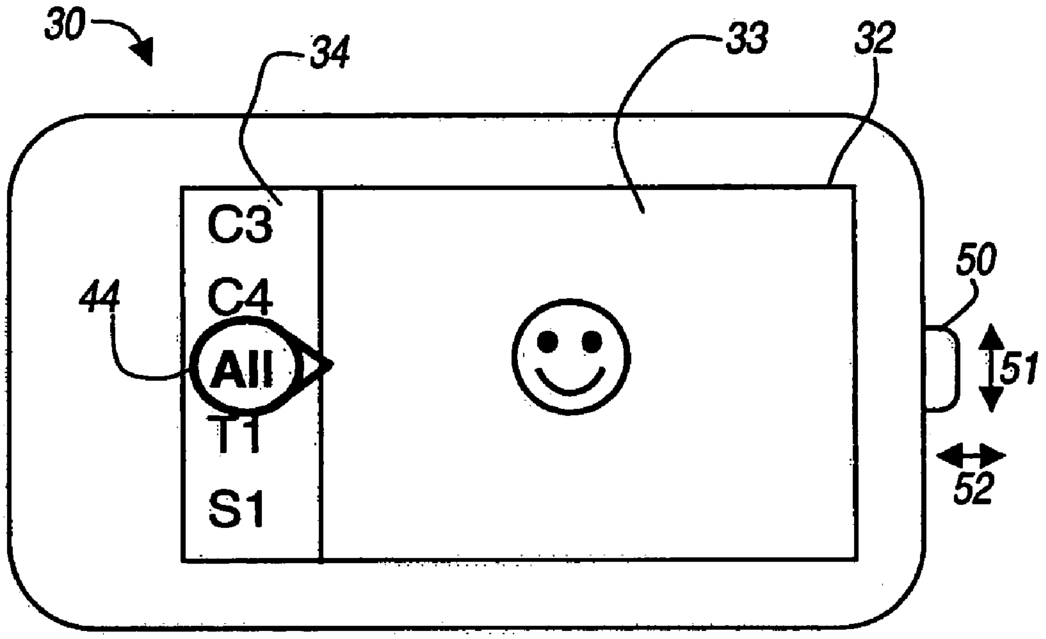
FIG. 4 is a second preferred embodiment of a portable terminal according to the present invention.

With reference to FIG. 4 an alternative embodiment of the portable terminal 30 is shown. The display 32 has been adapted to display in section 34 a straight array with objects representing the image processing devices in section 34. Section 33 displays general information, operating status information and selectable menu items.

The rotary ring 35 has been replaced by a slide switch 50. The slide switch 50 can be manipulated by the operator to slide upwards and downwards in the direction of the arrow 51. The slide switch 50 can be pressed in the direction of arrow 52 for selection purposes. The slide switch 50 is resiliently biased to take a neutral position in which it is in the middle of its translative range in the direction of arrow 51 and outwards at the end of its translative range in the direction of arrow 52. Section 33 of the display 32 is normally active, and sliding the slide switch 50 upwards results in the array of objects to scroll upwards and sliding the switch downwards results in the array to scroll downwards. Moving the slide switch 50 in the direction 51 while keeping it depressed results in scrolling through the image devices, and releasing the slide switch selects the device currently present in the selection loop 44. Section 33 then becomes active, and shows the status information as described further above. The software can be programmed such that one upward movement of the slide switch 50 moves the array of objects upwards by one object so that the next object in the array is placed in the selection loop 44.

The use of a display with in which graphical icons are used instead of acronyms is shown in FIG. 5. The movable array thus comprises different graphical icons. A particular graphical icon is assigned to each type of image processing device, e.g. printers are assigned the icon that is generally used for this purpose in PC software. Photocopiers are assigned a graphical icon resembling a photocopier, etc. The particular image processing device is further identified by a number displayed with the graphical icon. Also, status icons may be combined with the device icons to give the operator a first indication of the status of all devices shown on the display. Examples of such status icons are a red cross for unavailable devices and an hour glass for devices temporarily out of service.

When a new image processing device is added to the population of devices monitored with the aid of the portable terminal, its particulars are registered in the control program of the server 20 (FIG. 1) by a service engineer, or it may present itself to the server automatically. The server 20 then includes the new device in its status monitoring service and transmits installation data to the portable terminal 30, such that it may register the new device and add it to the list of devices in the display section 34 and related monitoring services.

Also, when an image processing device is removed from the population of devices, it is deleted from the monitoring service in the server 20. In that case, the server 20 sends a signal to the portable terminal 30 to delete the device from its display and service.

In the description above, the monitoring service is, for the greater part, implemented in the server 20 (FIG. 1), and the portable terminal simply operates as a user interface to the monitoring service in the server 20. Such an implementation has the advantage that data traffic between the server 20 and the portable terminal 30 is minimized.

However, it would also be possible to implement the monitoring service in the portable terminal and use the server 20 only for collecting status data of the monitored devices.

It would also be possible to do without the server 20 and include a wireless transmitter into each of the devices. The devices would then themselves send their status data to the portable terminal, that would include a monitoring service for processing the status data of the devices. In this case, the control program of the portable terminal is also provided with a registering service to register all devices to be monitored.

While the preferred embodiments of the devices and methods have been described in reference to the environment in which they were developed, they are merely illustrative of the principles of the invention. Thus, other embodiments and configurations may be contemplated without departing from the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of monitoring the operating status of a plurality of image processing devices located in a proximate environment, comprising:

sending wireless signals incorporating current operating status data for each of the image processing devices;

receiving the wireless signals by at least one portable terminal; and presenting the current status data of the image processing devices at the portable terminal in the form of either a general system status indication or a device status indication regarding a particular image processing device, as specified by a user selection at the portable terminal and in accordance with a predetermined presentation scheme.

2. The method of claim 1, wherein the predetermined presentation scheme prescribes presenting said general system status indication and automatically switching to said device status indication regarding a particular image processing device when a predetermined event occurs in that particular image processing device.

3. The method of claim 2, wherein the predetermined presentation scheme is based on a predetermined priority scheme for events occurring in the devices.

4. The method of claim 3, wherein the predetermined presentation scheme prescribes to always present a device status indication regarding a particular image processing device, when in that device an event having a high priority occurs.

5. The method of claim 3, wherein the predetermined presentation scheme prescribes to conditionally present a device status indication regarding a particular image processing device, when in that device an event having a low priority occurs, said conditional presentation meaning, that said device status indication is only presented when the portable terminal is within a predetermined distance from the particular image processing device.

6. The method of claim 4, wherein an event impeding operation of a device has a high priority.

7. The method of claim 5, wherein an event hampering normal operation of a device, but not requiring immediate attention, has a low priority.

8. The method of claim 1, further comprising the step of providing operating elements on the portable terminal for enabling the user selection of either the general system status indication or the device status indication regarding a particular image processing device.

9. The method of claim 1, wherein the general system status and the device status information is presented on the portable terminal in one of at least two operator-selectable presentation levels, including a first, global, level and a second, detailed, level.

10. The method of claim 9, wherein each of said presentation levels has an associated presentation format.

11. The method of claim 10, wherein the presentation format associated with the first presentation level includes simple graphical symbols.

12. The method of claim 4, wherein the presentation of device status indication in connection with an event having a high priority includes an audible and/or vibrational alarm.

13. The method of claim 2, wherein the portable terminal, when it presents a device status indication regarding a particular image processing device in connection with an event having a high or middle priority, prompts an operator for a response, including at least an acknowledgement and a command to postpone that particular status presentation to a predetermined later time.

14. The method of claim 2, further comprising the step of displaying, upon request of an operator, through operating means on the portable terminal and in connection with an event having high or middle priority, service guidance information on the display of the portable terminal.

15. A system for monitoring the operating status of a plurality of image processing devices located in a proximate environment, comprising:

a plurality of image processing devices;

at least one transmitter connected to said plurality of image processing devices, for sending wireless signals incorporating current operating status data for each of said image processing devices; and a portable terminal provided with a receiver for receiving said wireless signals, said portable terminal being provided with a display and with a presentation module that presents on the display the current status data for each of the image processing devices in the form of either a general system status indication or a device status indication regarding a particular image processing device, as specified by a user selection at the portable terminal and in accordance with a predetermined presentation scheme.

16. The system according to claim 15, further comprising a server connected to said plurality of image processing devices for collecting said operating status data and passing said operating status data to said at least one transmitter.

17. The system according to claim 15, wherein each of said image processing devices is provided with a transmitter for sending wireless signals incorporating image processing device status data and said portable terminal is provided with a device that collects the status data for all of the image processing devices.

18. The system according to claim 15, wherein each of the image processing devices and said portable terminal are connected to a wireless network.

19. The system according to claim 15, wherein the signals are RF or IR signals.

20. The system according to claim 15, wherein the predetermined presentation scheme prescribes presenting said general system status indication and automatically switching to said device status indication regarding a particular image processing device when a predetermined event occurs in that particular image processing device.

21. The system according to claim 20, wherein the predetermined presentation scheme is based on a predetermined priority scheme for events occurring in the devices.

22. The system according to claim 21, wherein the predetermined presentation scheme prescribes to always present a device status indication regarding a particular image processing device, when in that device an event having a high priority occurs.

23. The system according to claim 21, further including a distance-sensing module that determines the distance between the portable terminal and at least one of the image processing devices, wherein the presentation module is adapted to conditionally display a device status indication regarding a particular image processing device, when in that device an event hampering normal operation of a device, but not requiring immediate attention, occurs, said conditional display meaning, that the device status indication is only displayed when the portable terminal is within a predetermined distance from the particular image processing device.

24. The system according to claim 15, wherein an event impeding operation of a device has a high priority.

25. The system according to claim 15, wherein an event hampering normal operation of a device, but not requiring immediate attention, has a low priority.

26. The system according to claim 15, wherein the portable terminal is provided with a selection device that selects either the general system status indication or a particular device status indication, and wherein the presentation module is connected to the selection device to present the selected status indication on the display of the portable terminal.

27. The system according to claim 26, wherein the selection device of the portable terminal includes:

a movable operating element;

a selection display module for at least partially displaying an array of display objects representing the total system and the individual devices and for displaying a marker, on the display of the terminal, said array being movable along said marker or vice versa, wherein the movement of the array or marker is substantially coinciding with the movement of the movable operating element, and the movable operating element is so located that it perceptually at least partially overlaps with the display such that the array or the marker appears to be part of the operating element.

28. The system according to claim 27, wherein the movable operating element is a rotary ring and said array is circular or at least arc shaped.

29. The system according to claim 15, wherein the presentation module is adapted to display the status information on the display of the portable terminal in one of at least two operator-selectable presentation levels, including a first, global, level and a second, detailed, level, each of said presentation levels having an associated presentation format.

30. The system according to claim 15, wherein the portable terminal is provided with a device that generates an audible and/or vibrational alarm.

31. A portable terminal for use with a plurality of image processing devices and at least one transmitter connected to the plurality of image processing devices, for sending wireless signals incorporating current operating status data for each of said image processing devices, said portable terminal comprising:

a receiver for receiving said wireless signals, said portable terminal being provided with a display and with a presentation module that presents on the display the current status data for each of the image processing devices in the form of either a general system status indication or a device status indication regarding a particular image processing device, as specified by a user selection at the portable terminal and in accordance with a predetermined presentation scheme.

* * * * *